United States Patent
Thomas et al.

(10) Patent No.: US 10,013,535 B2
(45) Date of Patent: Jul. 3, 2018

(54) SOFTWARE CONFIGURATION OF MODULE DEPENDENT ON HISTORY

(75) Inventors: Andrew James Thomas, Bishops Stortford (GB); Mark Skrebels, Datchworth (GB); Stewart Irvine, Sawbridgeworth (GB)

(73) Assignee: Ciena Corporation, Hanover, MD (US)

( * ) Notice: Subject to any disclaimer, the term of this patent is extended or adjusted under 35 U.S.C. 154(b) by 2848 days.

(21) Appl. No.: 10/719,867

(22) Filed: Nov. 21, 2003

(65) Prior Publication Data

US 2005/0114234 A1  May 26, 2005

(51) Int. Cl.
*G06Q 10/00* (2012.01)
*G06F 21/10* (2013.01)
*G06Q 10/08* (2012.01)

(52) U.S. Cl.
CPC ......... *G06F 21/10* (2013.01); *G06Q 10/087* (2013.01); *G06F 2221/0797* (2013.01); *G06F 2221/2137* (2013.01); *H04L 2463/101* (2013.01)

(58) Field of Classification Search
None
See application file for complete search history.

(56) References Cited

U.S. PATENT DOCUMENTS

| | | | | |
|---|---|---|---|---|
| 4,688,169 A * | 8/1987 | Joshi | ............... | 726/29 |
| 4,736,422 A * | 4/1988 | Mason | ............... | 380/228 |
| 4,796,220 A * | 1/1989 | Wolfe | ............... | 705/56 |
| 5,023,907 A * | 6/1991 | Johnson et al. | ............... | 710/200 |
| 5,337,357 A * | 8/1994 | Chou et al. | ............... | 705/56 |
| 5,416,840 A * | 5/1995 | Cane et al. | ............... | 705/52 |
| 5,450,489 A * | 9/1995 | Ostrover et al. | ............... | 705/51 |
| 5,457,746 A * | 10/1995 | Dolphin | ............... | 705/51 |
| 5,499,298 A * | 3/1996 | Narasimhalu et al. | ............... | 705/54 |
| 5,502,766 A * | 3/1996 | Boebert et al. | ............... | 713/193 |
| 5,552,776 A * | 9/1996 | Wade et al. | ............... | 340/5.74 |
| 5,629,980 A * | 5/1997 | Stefik et al. | ............... | 705/54 |
| 5,703,951 A * | 12/1997 | Dolphin | ............... | 705/51 |
| 5,715,403 A * | 2/1998 | Stefik | ............... | 705/44 |
| 5,745,568 A * | 4/1998 | O'Connor et al. | ............... | 705/56 |
| 5,765,152 A * | 6/1998 | Erickson | ............... | 707/9 |
| 5,794,032 A * | 8/1998 | Leyda | ............... | 713/2 |
| 5,809,143 A * | 9/1998 | Hughes | ............... | 705/77 |
| 5,892,900 A * | 4/1999 | Ginter et al. | ............... | 726/26 |
| 5,926,624 A * | 7/1999 | Katz et al. | ............... | 709/217 |
| 5,933,498 A * | 8/1999 | Schneck et al. | ............... | 705/54 |
| 5,949,877 A * | 9/1999 | Traw et al. | ............... | 713/171 |
| 5,991,399 A * | 11/1999 | Graunke et al. | ............... | 380/279 |

(Continued)

*Primary Examiner* — John W Hayes
*Assistant Examiner* — John M Winter
(74) *Attorney, Agent, or Firm* — Clements Bernard Walker PLLC; Christopher L. Bernard; Lawrence A. Baratta, Jr.

(57) ABSTRACT

A program controller is arranged to automatically authorize or configure or upgrade a program for a customer replaceable card of a system, the controller being arranged to manage the program automatically, according to a licence agreement, and according to a stored history of use of the hardware module. A supplier can track customer changes and enforce more easily different conditions for authorizing the program on, different modules from different sources, having different levels of capability. There can be less interaction with the supplier to get specific authorizations. The history can be stored on the module. It can be used to ease inventory tracking and generate billing information.

24 Claims, 7 Drawing Sheets

(56) References Cited

U.S. PATENT DOCUMENTS

| | | | | |
|---|---|---|---|---|
| 6,006,332 | A * | 12/1999 | Rabne et al. | 726/6 |
| 6,065,055 | A * | 5/2000 | Hughes et al. | 709/229 |
| 6,073,123 | A * | 6/2000 | Staley | 705/58 |
| 6,135,646 | A * | 10/2000 | Kahn et al. | 709/217 |
| 6,141,712 | A * | 10/2000 | Sudhakaran | G06F 9/4401 710/104 |
| 6,151,631 | A * | 11/2000 | Ansell et al. | 709/229 |
| 6,226,618 | B1 * | 5/2001 | Downs et al. | 705/1 |
| 6,289,460 | B1 * | 9/2001 | Hajmiragha | 726/28 |
| 6,311,214 | B1 * | 10/2001 | Rhoads | 709/217 |
| 6,341,352 | B1 * | 1/2002 | Child et al. | 726/1 |
| 6,357,010 | B1 * | 3/2002 | Viets et al. | 726/4 |
| 6,468,160 | B2 * | 10/2002 | Eliott | 463/43 |
| 6,606,707 | B1 * | 8/2003 | Hirota et al. | 713/172 |
| 6,664,976 | B2 * | 12/2003 | Lofgren et al. | 345/634 |
| 6,718,328 | B1 * | 4/2004 | Norris | 707/9 |
| 7,228,567 | B2 * | 6/2007 | Serkowski et al. | 726/30 |
| 2004/0003271 | A1 * | 1/2004 | Bourne et al. | 713/193 |

* cited by examiner

SOFTWARE CONFIGURATION OF MODULE DEPENDENT ON HISTORY

FIELD OF THE INVENTION

This invention relates to program controllers for controlling configuration of a program for a module of a modular system, to such programs, to such modules, to methods of licensing software, and to methods of offering a communications service over such apparatus.

BACKGROUND TO THE INVENTION

A license mechanism for software is generally known as meaning any mechanism for enforcing specific terms of a right to use agreement between an organization supplying the software and clients (the customers of the software). A simple example of these terms is a "trial" version of software, where a client can install and use the software for a limited time period or number of executions, after which they must purchase the software or stop using the software. Another possibility is a "demo" version of software, where the demo has some significant or critical features missing, but when purchased clients may use those features without restriction.

A known license mechanism involves having software locks for modules of the software, and a client can pay for activation codes at any time from the supplier, to enter into the software to release the locks and enable use of each module as required. An example is the SoftwareShield™ Licensing System available from SoftwareShield Technologies of Vancouver, British Columbia. This can also implement pay-per-use, where the client prepays for usage of specific program features; periodic expiry, where the client must pay a licensing fee every month to continue using the software; "poison-pill", where no matter what happens—the software will cease to work after a specific date. The SoftwareShield License can hold up to 50 different Authorization Codes which can all do completely separate tasks allowing the supplier to effectively "remote-control" the software in different ways with a single license—and without redistributing a single file.

The licensing features configured by the supplier can be optionally hardware bound. This is a mechanism that essentially encodes a "FingerPrint" of the client computers into all Activation Request Codes sent by the client, and, in-turn, into Authorization Codes sent to the client. This ensures that even if the client were to give an illegal copy of the program to someone else, along with the Authorization Code, that code would not work on the other computer. A hardware-locked Authorization Code will only work on the exact computer that the client requested the code for.

SoftwareShield also provides a copy-protection mechanism that is a software/hardware locking mechanism that ensures that the software will not run on any system for which the license does not specifically authorize. This copy-protection mechanism is a FingerPrint locked system very similar to an Authorization Code described above. The primary difference between Copy Protection and other FingerPrint locked Authorization Codes is that Copy Protection provides some default handling if the system has not yet been authorized—prompting the customer if they want to release the copy protection now, linking them through their browser to a web-site where they can purchase it and providing a default Authorization Code input dialog for them. SoftwareShield (optionally) uses steganographic technology to conceal encrypted licence information inside image files.

A further development by Microsoft is known for use in personal computers, which involves storing an identification at registration time, of hardware used by software. If the software is then moved to run on other hardware, it may prevent use of the software if a given number of hardware changes are detected.

Another known technique is a software licence arrangement for LAN (Local Area Network) software. In this case a customer installs server software on a LAN server, and installs client software on each of a number of workstations. The software is licensed for a limited number of customers. The customer can plug in many workstations into the network, and log on to the network. When the server detects that the licensed number of workstations are logged on simultaneously, it is arranged to prevent further workstations from logging in.

However, such techniques are not used in the context of a multi-processor network element system which has automatic distribution of software from a shelf controller to individual customer replaceable cards plugged into a backplane of that shelf. Finger print techniques are not used because it is not practical to keep an up to date record of all the allowable combinations of card, backplane, software version for each customer. Each system can have a release of software having unique software for each of many different types of card.

However, if the cards are field replaceable, as they usually are, for maintenance purposes, this means a client can still obtain compatible third party cards and upgrade the software on them to the latest version, yet the supplier may be unaware and therefore unable to enforce the right to use agreement. It is often not practical to obtain specific authorization rapidly from the supplier each time a new card is plugged in because of the administrative burden on the supplier and the communications overhead involved.

Definitions

In this document, the term "modular system" is intended to encompass at least a system which can be expanded or configured by a user adding or changing hardware, such as by plugging or unplugging cards or any other types of modules into a rack or motherboard or any other structure.

The term "shelf controller" is intended to encompass at least any controller for controlling a group of modules plugged into a backplane or any other common structure. The term "backplane" is intended to encompass at least a structure for coupling a number of cards or similar modules.

The expression "manage a program" is intended to encompass any one or more of authorize or configure or upgrade or copy or distribute or monitor or audit operation of part or all of the program.

"history of use" is intended to encompass any one or more of ID of systems coupled previously, ID of prior customer (in case it is different to current customer) or of IDs of different licences to the same customers or indication of versions of prior programs loaded, for example.

The terms "program" and "software" are intended to encompass at least instructions, rules, objects, look up tables, hardware descriptions, combinations of these and other forms. They are intended to encompass a computer program product that includes a computer program mechanism embedded in a computer readable storage medium, and can contain program modules. These modules may be stored on a CD-ROM, magnetic disk storage product, or any other computer readable data or program storage product. The modules in the computer program product may also be distributed electronically, via the Internet or otherwise, by transmission of a computer data signal (in which the modules are embedded) on a carrier wave. Examples of implementation can include program objects that can be invoked via different programmatic paradigms e.g. API (application program interface, CLI (command line interface) and others, and can be invoked on a variety of different platforms including, but not limited to, a JAVA platform, an XML platform, a COM (common object model) platform and an ODBC (open database connectivity) platform for example.

SUMMARY OF THE INVENTION

It is an object of the present invention to provide improved apparatus and methods. According to a first aspect of the present invention, there is provided a program controller arranged for use with a modular system, and arranged to manage a program for use with a replaceable hardware module of the modular system, the module being a customer-replaceable part, the controller being arranged to manage the program automatically, according to an agreement between a supplier and a customer, and according to a stored history of use of the hardware module.

Notably, by using the hardware history, it can determine if a customer couples a module taken from another system (or obtained from another customer) and so the supplier can enforce more easily an agreement with different conditions for authorising use with, or for upgrading of a loaded program on, different modules from different sources, having different levels of capability or reliability for example. Thus where a customer obtains a module with lower hardware capability or older software or software licensed more restrictively, the agreement can be set up to allow this for example, but the supplier can charge more for using and servicing it, and a further different amount for upgrading the program for it. Using the history can enable the program controller to enforce such agreements with little or no supplier intervention. The appropriate action in the event of breaches of the agreement can now be taken, typically according to a predetermined policy. For example the supplier can prevent an upgrade, or allow it and record the event to enable enforcement of payment later for the consequential change in level of service for example. Another consequence is that instances of coupling an incompatible module can also be detected and preempted. This can help enable a supplier to provide different levels of service to reflect customer priorities, which can be charged at different rates for example. By looking at the history of use, it is possible to detect if the module hardware has been reconfigured or modified in the past, or has had incompatible software loaded. Such incompatibility can encompass capabilities that will not function correctly, or capabilities that can function correctly but are outside the agreement or are undesirable for any reason.

Compared to prior arrangements discussed above which rely on hardware identity (finger print) only, there can be advantages such as less restriction on the freedom of the customer to swap modules for legitimate maintenance purposes, or less interaction with the supplier to get specific authorisations which can be time consuming or administratively complex. Using the history of the module can make it easier to determine whether it falls within the agreement with the customer.

In principle it is not dependent on specifying where the history is stored, or where the program controller is located, or whether the system is a multi processor system or other type such as a single processor system, or whether the program runs on the module or runs elsewhere but interacts with the module. The term "control" is intended to encompass at least providing authorization for the program to operate, or downloading a new version of the program, or upgrading parts of it, or updating the associated history or licence information, or combinations of these. The configuration can involve activation or authorisation of part or all of the program, or installing a different version of the program for example, or can involve updating licence info for use in authorizing a given level of warranty support for the module. An example of such warranty support is provision of a replacement by a supplier within a given time, for a module which becomes faulty.

Further additional features for dependent claims include: the history being stored on the module. Although the history can be stored elsewhere in the system or anywhere outside the system, if stored on the module, it can be easier to keep it up to date, easier to associate with the module and can save costs involved in storing it elsewhere, such as communications costs if it is stored at a central location.

Another additional feature is he program controller being arranged to be part of a shelf controller for managing modules in the form of cards for carrying out functions of a network element for a telecommunications network. This is a common system configuration for systems having customer replaceable modules.

Another such additional feature is the program controller being arranged to determine an identity of the system and check it is authorized for use with that system. This can assist in ensuring the program controller is aware of a change in the system, so that appropriate action can be taken. The supplier can be alerted, or distribution of programs prevented for example, as appropriate.

Another such additional feature is the history comprising a program identifier of a program previously loaded on the module. This can assist the program controller to take appropriate action. Even if the history is blank, for example if the module is an old legacy module, this is useful information and the program controller can act accordingly. For example it can make a worst case assumption about the history.

Another such additional feature is the history comprising a licence identifier of a program previously loaded on the module. This can help enforcement of agreements which specify that a particular copy of the software is only to be used on specified systems for example.

Another such additional feature is the program controller being arranged to be located remotely from the system, and coupled to the system by a communications link. This can be more efficient in some cases, and enable many systems to be served by a single program controller for example.

Another such additional feature is the program controller being arranged to maintain an inventory record of identities and relationships of modules, programs, and licence information for a given customer. This can help address the difficulty in keeping such information up to date, particularly in systems where the customer is free to swap modules. Such inventory records can be useful for many purposes, such as organising hardware servicing, software version control and compatibility, billing, and licence enforcement for example. Such inventory records can be stored centrally or in distributed fashion at each system, and can include historical information as well as current information. The program controller can hold the history information and communicate it periodically to a central location of a supplier, where it is desirable to minimize an amount of communication to the central inventory store.

Another such additional feature is the program controller being arranged to determine any changes in modules, at initialisation, and to check the configuration of any newly coupled modules.

Another such additional feature is the managing comprising copying all or part of the program to the module at initialisation. This can involve upgrading of a program already loaded, or sending a code or instruction to the module to authorize or enable operation of software already loaded on the module for example. The initialization can encompass initialization of the module, or of the program controller or of all or part of the system for example, and could be after power up, or any type of event or reset for example. An alternative to doing it at initialization is to do it periodically as part of an audit process for example.

Another such additional feature is the managing comprising authorising all or part of the program for the module at initialisation.

Another such additional feature is the history comprising an indication of which systems the module has been coupled to. This is one way of determining whether the module has been used under a different agreement previously and could therefore have a program loaded for which the present customer has no agreement to use. Alternatively or as well, the history can include details of software loaded most recently, or can include details of several or all prior loadings. The history can also include the customer ID, the software version, the backplane ID, or other details, to enable enforcement of licensing terms which are specific to each customer, to different backplanes, or to different versions of the software, respectively. Optionally the history could simply comprise a logical flag to indicate that the module has encountered another system which has overridden license restrictions to load a program to that module for the purposes of that other system. In other words the program on the module has been upgraded though the license information still indicates the original version. The purpose here is to get some of the benefit of history with reduced history storage requirements. Another option instead or as well is for another flag to be used to indicate that an upgrade or program has been loaded temporarily by a previously coupled system and this is not licensed for use in another system.

Another such additional feature is the program having licence information indicating a capability licensed, the program controller being arranged to configure the program according to the capability licenced. This can correspond to a key term of a licence, and so it is useful to be able to enforce different levels of capability of the program on the module. Such configuration can encompass upgrading the program to the licensed capability level, or authorizing only parts of a program to limit the capability for example. The capability licensed can also encompass indicating the capability being time varying or time limited, for example. In some examples the capability available can be changed by changing the capability licensed. The program controller can detect such a change at initialisation or periodic audit time and implement the revised capability.

Another such additional feature is the program having license information indicating license expiry information. Such information can indicate a date or what action is to be taken on expiry for example.

A second aspect of the invention provides a program arranged for use with customer replaceable hardware module of a modular system, the program being arranged to cooperate with a program controller, to enable the program controller to manage the program according to a history of use of the module, the program having licence information relating to conditions of use of the program agreed with a supplier, the program being arranged to update the history of use of the module, with at least some of the licence information.

Another such additional feature is the licence information indicating which systems the program is authorized to be used with. This can help the supplier to enforce an agreement limiting the number or type of systems that the program can be used with, and can help ensure reliable operation by pre empting operation with incompatible systems.

Another such additional feature is the licence information indicating if the program can be downloaded to a shelf of the system for automatic distribution to modules in the form of cards coupled to the shelf.

Another such additional feature is the licence information indicating if the program can be distributed to the module.

Another such additional feature is the licence information indicating a capability licensed. This can include for example a capability of upgrading an existing program.

Another aspect provides a modular system having one or more modules and a program controller as set out above.

Another such additional feature is the system having an interface for coupling to a remote server to pass information for a supplier to maintain an inventory of programs and modules.

Another aspect provides a module for use in a modular system, and being a customer replaceable part of that system, the module being associated with a program arranged to operate the module, the module having a non volatile memory, and having an interface to cooperate with a program controller located external to the module, the program controller being arranged to manage the program, the module being arranged to store securely in the non volatile memory a history of use of the module and the associated program, and being arranged to make that history available to the program controller.

Another such additional feature is the history comprising licence information of a program previously used with the module.

Another such additional feature is the history comprising identity of one or more systems the module had previously been coupled to.

Another such additional feature is the history comprising identity of a customer of a program previously used with the module.

Another aspect provides a method of servicing the module, the method having the steps of obtaining the stored history of use from the module, and using the history in arranging servicing of the module.

This history can help enable efficient enforcement of agreements involving different levels of servicing to suit a customer.

Another aspect provides billing software arranged to generate billing information relating to use of a program by a customer, the program being under the control of a program controller, the program being arranged to run on a customer replaceable hardware module of a modular system, the program being arranged to cooperate with a program controller, to enable the program controller to control use of the program according to a history of use of the module, the billing software being arranged to carry out the steps of:

obtaining information about the use of the program from the history of use of one or more of the modules, and generating the billing information according to the obtained information and from terms of a licence agreed with the customer.

This can make it easier and more efficient to enforce and bill for use or service according to a software license agreement or a service agreement.

Another aspect provides a method of managing a program for use with a replaceable hardware module of a modular system, the module being a customer-replaceable part, the method having the steps of accessing a stored history of use of the hardware module, and controlling the program automatically, according to the history and according to an agreement between a supplier and a customer.

This corresponds to the first aspect, so similar advantages can apply. The method could be valuable to cover a service offered for example.

Another aspect provides apparatus for managing a program for use with a replaceable hardware module of a modular system, the module being a customer-replaceable part, the apparatus having means for accessing a stored history of use of the hardware module, and means for managing the program automatically, according to the history and according to an agreement between a supplier and a customer.

Another aspect provides a sequence of signals used to control a program for use with a replaceable hardware module of a modular system, the module being a customer-replaceable part, the sequence having signals to a program controller related to accessing a stored history of use of the hardware module, and signals from the program controller relating to controlling the program automatically, according to the history and according to an agreement between a supplier and a customer.

Again this corresponds to the first aspect and can be valuable where some equipment is placed outside the jurisdiction, but to achieve effects in the jurisdiction for example.

Another aspect provides a method of offering a communications service over a network using the above mentioned system.

If the improvement to the system enables improved network performance such as being more reliable or more flexible, having a greater capacity, or being more cost effective. Consequently services over the network can be enhanced or made more efficient, and the value of such services can increase. Such increased value of services, could prove far greater over the life of the system than the sales value of the equipment.

Another aspect provides inventory software arranged to maintain an inventory of programs and customer replaceable modules for multiple modular systems, the software being arranged to cooperate automatically with one or more program controllers as set out above to obtain licence information about the programs, and to obtain the history of use of the modules.

This can make it easier and more efficient to keep such an inventory up to date, even where customers have replaced modules without supplier intervention. It can help reduce an amount of intervention from a supplier and can keep communications overhead low. Such an inventory can be useful for many purposes including billing, maintenance, network planning, network management and others.

Another additional feature is the program controller being in the form of software. This acknowledges that software can be a valuable, separately tradable commodity. It is intended to encompass software, which runs on or controls "dumb" or standard hardware, to carry out the desired functions, (and therefore the software essentially defines the functions of the controller, and can therefore be termed a controller even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions. This does not preclude an implementation in conventional hardware.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which.

DETAILED DESCRIPTION OF PREFERRED EMBODIMENTS

Figure 1:
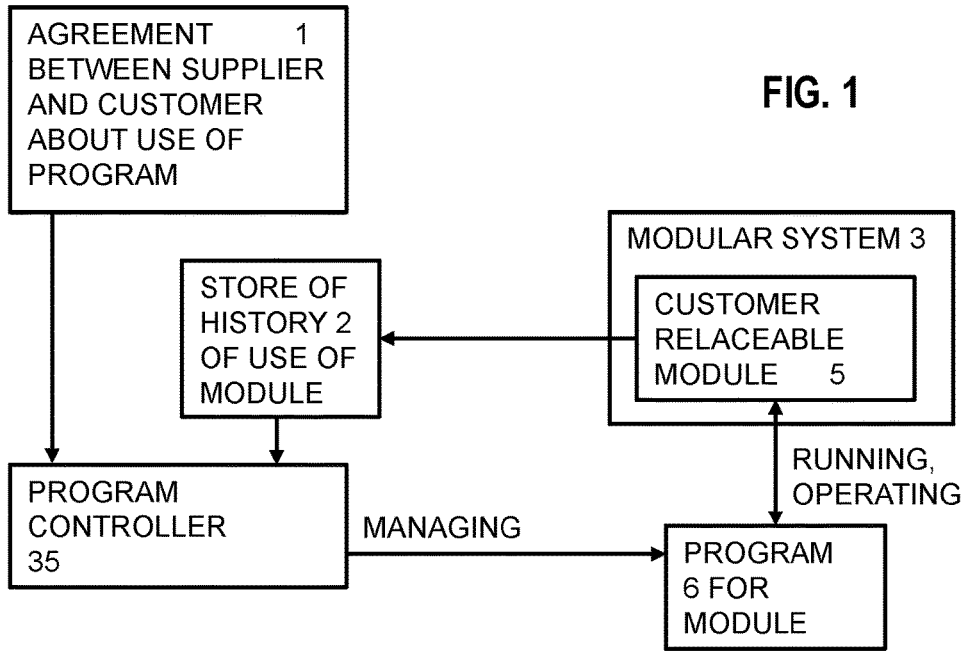
FIGS. 1 to 3 show arrangements of elements according to embodiments of the invention.

Some of the embodiments described below are concerned with methods of controlling software distribution from the suppler to the customer (e.g. an EMS/NE Element Management System/Network Element) and controlling distribution of the software the customer has (e.g. from EMS to the NEs or the NEs distributing software from the shelf controller to the other cards) with minimal supplier intervention and to provide a mechanism for tracking and controlling inventory in the field. The EMS is an example of a supplier's central inventory control part, the shelf controller SC can incorporate an example of a program controller, and the cards are one form of the modules. Of course it can be applied to other types of modular systems having customer replaceable modules. As such the system can prevent distribution and/or use of the software that is not permitted under the terms of the licence and can prevent cards, shelves or bays being used in a customer network which the customer has not purchased from the supplier, and which can therefore contain older versions of software which may be incompatible, or which can have copyrights for which the customer has no licence to use. The method allows the exact policy to be changed by the supplier on a per customer basis to align with the agreed contract of sale or terms and conditions between the supplier and the customer. Benefits can include increased revenue by charging correctly for software and cards in use by a customer, and preventing support for software/hardware that is not covered under an existing right to use agreement that the customer has.

The method can involve attaching licence information to software distributed to the customer. The licence information is then automatically distributed to the customer's networks elements and the cards placed within the network elements without intervention by the customer or the supplier. An example of the licence information is four fields as follows:

Customer identifier field e.g. a 20 character field
License capability field indicating pre-defined capabilities
Expiry time/date field
List of valid backplane identifiers field The licence information can describe a set of configurable capabilities that control the use and deployment of the software load within the customer network. Each software load for a unique card has its own licence information. The licence for each software load can be enabled by a key that will expire on a certain date. These capabilities can include at least the following: (i) download software to shelf not covered by this licensing scheme e.g. a shelf bought by the customer on the grey market; (ii) being able to upgrade a card that the customer owns; (iii) being able to upgrade a card that has come from another customer's network; (iv) being able to upgrade card with no licence information stored on it.

If a customer action (i-iv above) requires a capability that is not allowed then a particular policy can be applied. For example this could mean any and each of the following: restricting the capability; raising a log; raising an alarm; allowing the capability or other action. In all circumstances the capability attempt is logged by the network element for future reference.

When the licence is expired an additional policy may be applied. For example: restricting the capabilities; raising a log; raising an alarm; allowing the capability. In all circumstances the licence expiry is logged by the network element for future reference. In order to renew the licence the customer must contact the supplier for a renewal key. At the same time the supplier will retrieve licence grant and/or usage history information from the network elements.

Using these licences, capabilities and policies in combination, the supplier can if required:

Control software distribution automatically with minimal or no intervention by the customer or the supplier,
Configure programs in a number of different ways to allow different types of licence agreement,
Restrict backplane use within a network and therefore the operation of the NE.
Restrict software upgrade if not permitted under the terms of the licence.
Track inventory location in a customer's network.
Restrict a function of the network element.
Restrict further software download.
Restrict card use within a particular network element.
Distribute licence information without customer intervention.
Track card/backplane relationships attempted.
Detect and handle cards with no licence information on them.
Prevent or bill for cards being used in a network that come from another customer's network, which can have unlicensed programs.
Prevent or bill for backplanes being used in a network that come from another customer's network, if the software licence agreements are billed per backplane for example.

Figure 2:
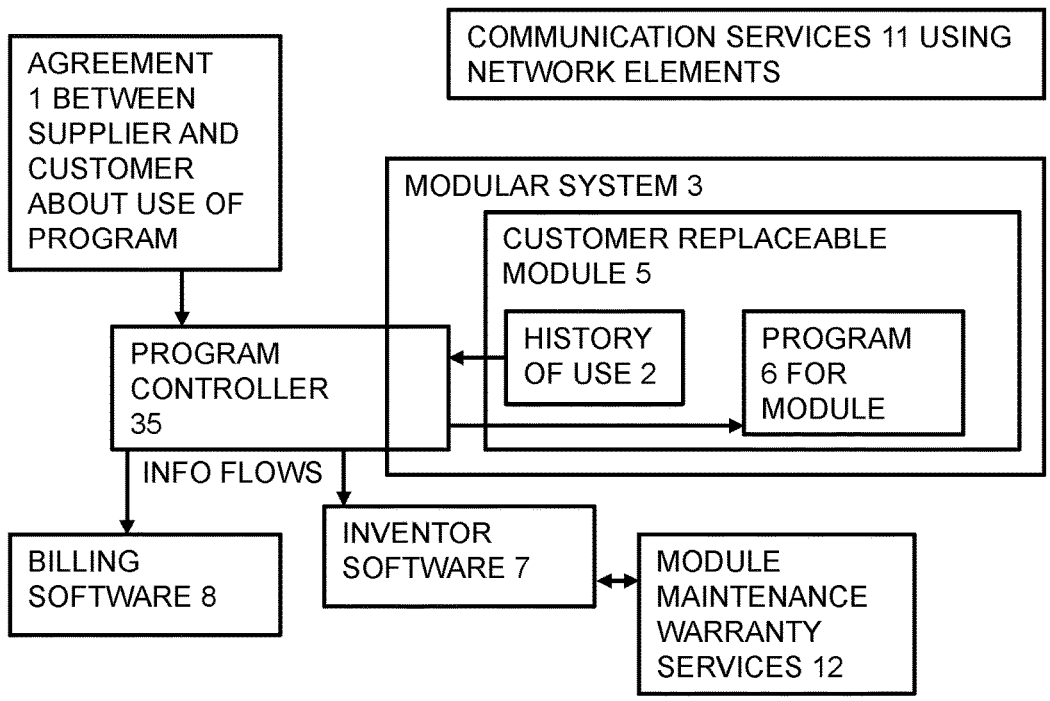
Figure 3:
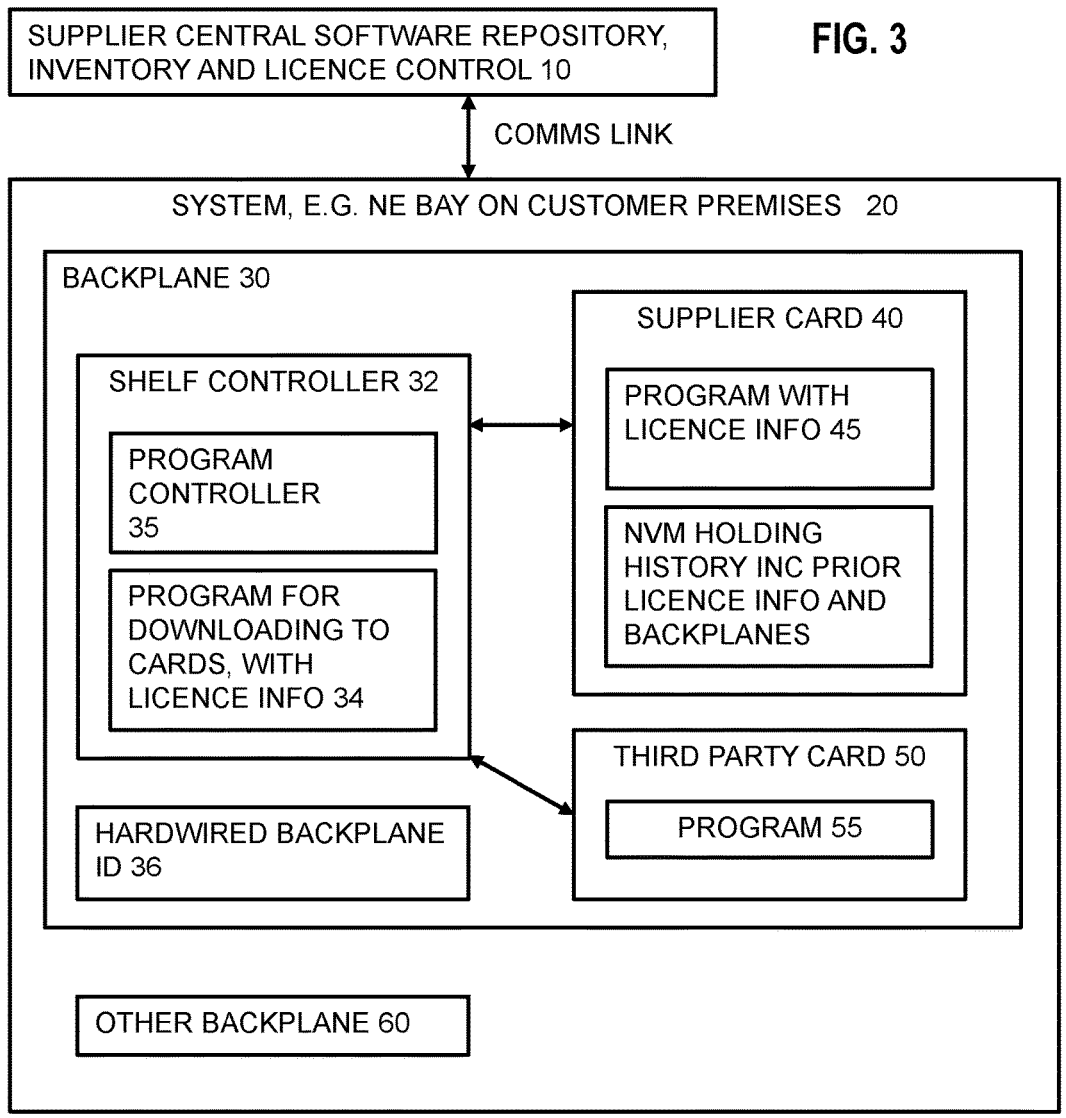

FIGS. 1-3, Arrangement of Elements

FIG. 1 shows in schematic form some of the principal elements. A program controller 35 manages a program 6. The program is associated with a customer replaceable module 5, to run or operate the module for example. The module is a hardware part of a modular system 3. A history 2 of use of the module is stored and used by the program controller in managing the program. The program controller also acts according to an agreement 1 between a supplier of the program, and the customer. This is usually a hardcopy agreement whose terms are reflected in software of the program controller, though in principle the agreement could be in the form of a remotely located database of rules or parameters. The operation of these elements and more details of examples of implementations will be described below.

FIG. 2 shows another example of an arrangement of elements according to an embodiment. In this case the modular system forms a network element of a telecommunications system. The network element is used with other network elements (not shown) to provide communications services 11. The program 6 is located on, or runs on the module 5. As before, the program controller manages the program according to the agreement and according to the history. The program controller supplies information to billing software 8 and to inventory software 7. The inventory software can be used to help supply module maintenance and warranty services 12. The program controller 35 is shown located part within the network element and part externally, its functions can be located or distributed to suit.

FIG. 3 shows in schematic form some of the principal elements of an example of an implementation. Many other examples can be envisaged. A supplier has a central software repository inventory and licence control part 10. This central control part can be located remotely and may service many systems at different locations. It can incorporate the billing and inventory software mentioned above. The central control part 10 is typically implemented in software running on a server coupled to a local area network. It is coupled to a system in the form of a network element having one or more bays 20 located typically on customer premises. Clearly although this example relates to network communications equipment, similar principles are applicable to any type of system having field replaceable modules. The bay is coupled to the supplier's location by a comms link which can be implemented over conventional signalling networks, or relatively low data rate standards such as ethernet. The bay is typically implemented in the form of an equipment rack having a number of shelves. Each shelf will have a backplane 30. The shelf has a shelf controller SC 32 which controls and monitors traffic between the cards plugged into the backplane, controls timing of interfaces, power supplies to the cards and other such functions. The shelf controller stores or generates a copy of a program 34 for downloading to each of the cards plugged into the backplane. A program controller 35 is used to control distribution, upgrading and authorisation of use of the program on the module as will be discussed in more detail below. The program contains licence information for controlling or monitoring the use of the software, including distributing the software to the cards, and enabling use of it. The backplane will have a hardwired backplane identifier ID 36. Another backplane 60 is shown, there can be many similar backplanes according to the application.

The figure shows a supplier card 40, and a third party card 50. The supplier card 40 includes a copy 45 of a program downloaded from the shelf controller, and including its own licence information. Likewise the third party card 50 includes a program 55 which may have been downloaded from a different system, and may have no licence information. The supplier card also includes non-volatile memory NVM 48 for holding licence information downloaded from the shelf controller and for holding a history of the use of the supplier card. Such history of use can include which backplanes the supplier card has been used with in the past, which customers, and which versions of programs and their licence information have been downloaded to it from which shelf controller.

These cards are examples of the modules discussed above. The modules can of course be implemented in other formats. A typical rack can hold twenty to thirty cards, depending on the backplane and the card dimensions. Each card typically has a processor and associated memory for running the software. Interfaces to other cards or to external devices can be included, depending on the function of the card. In a typical network element there could be cards for optical fibre interfaces, and other functions such as optical to electrical conversion, demultiplexing communication signals, and processing the demultiplexing signals to reroute them, or provide other communications functions such as error correction, reading of packet headers and so on.

Although in the figure the program controller is shown located on the shelf controller, another option is to have some of the program controller functions such as inventory gathering and temporary storage of large amounts of inventory data located externally to the system. This can involve, for example an element management system on a workstation located locally or regionally attached to the system (NE) by a communications link.

Figure 4:
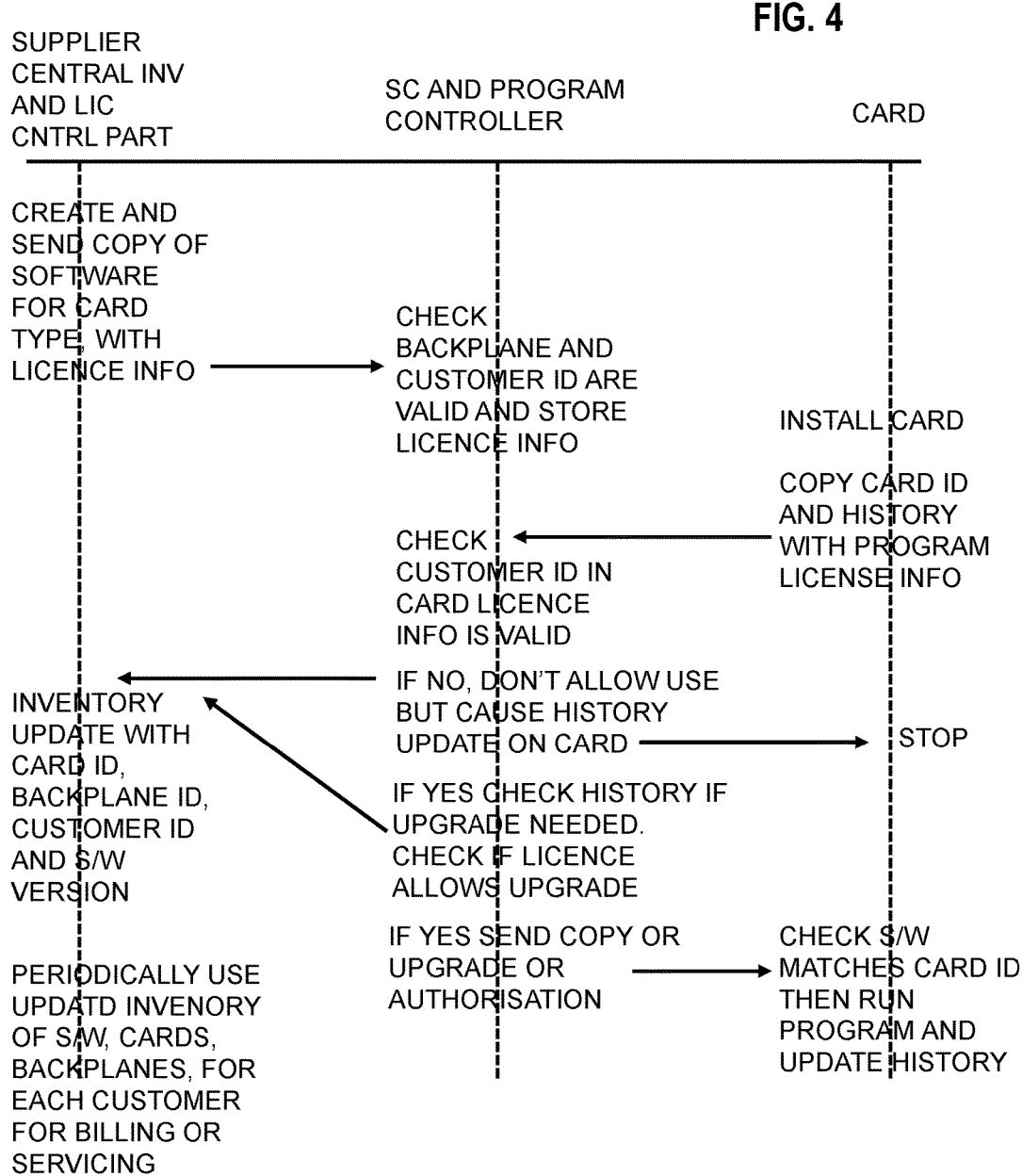
FIG. 4 shows a sequence chart according to an embodiment of the invention, for the case of a card being installed.

FIG. 4, Sequence Chart for Case of Card being Installed

FIG. 4 shows a sequence chart showing some of the functions of the elements shown in FIGS. 1-3, relating to actions occurring at initialisation of a card, when a card is inserted, or is reset for example. The three columns in FIG. 2 show the actions of the suppliers central control part, the shelf controller incorporating the program controller, on the backplane, and the card respectively. A first step is the central control part creating a copy of the software for the card, creating licence information specifying for example a list of authorised backplanes for that customer, a list of card types or versions, and a number of levels of distribution, copying and upgrading capabilities of that software for that customer. This can of course be carried out by the program controller under the direction of the central part. The licence information can be encrypted using well known techniques such as public key encryption techniques, and the software can be downloaded to the shelf controller either over the comms link, or by other means such as tape or disc if the bay has appropriate reading equipment. The program controller then decrypts the licence information, and checks if the licence information shows the correct backplane and or customer ID. This can involve checking the backplane ID matches the list of backplanes in the licence information. At any time previously, or subsequently, the card is installed by being plugged into the backplane, and the card automatically updates its history of which backplanes it has been coupled to, and which program versions have been downloaded. The card ID and part or all of the history on the card are copied to the program controller to enable it to carry out its checks. If these checks are passed, a copy of the program is downloaded from the shelf controller to the card, or the existing program is authorised or upgraded as appropriate. Otherwise, the controller does not allow use of the card program, but causes an entry in the history on the card to indicate the card was attached to this backplane, but rejected. A record of this can also be held by the program controller for downloading now or later to the suppliers central inventory and licence control. This central part can then track movements of cards between systems, The card can then check the program matches the card ID and then begins using the software. The shelf controller will send information back to the supplier control element to update its inventory of software and hardware. Such information can include the card ID, backplane ID, and software version numbers, together with an indication that the software has been successfully distributed down to the relevant card. The supplier's central control element can check this inventory update is not inconsistent with terms of the licence agreement for that customer, and can take enforcement action. The central control part can include software for generating billing information periodically, based on the history of use information. Other management functions such as arranging servicing of the hardware can also make use of the improved automated inventory gathering.

Figure 5:
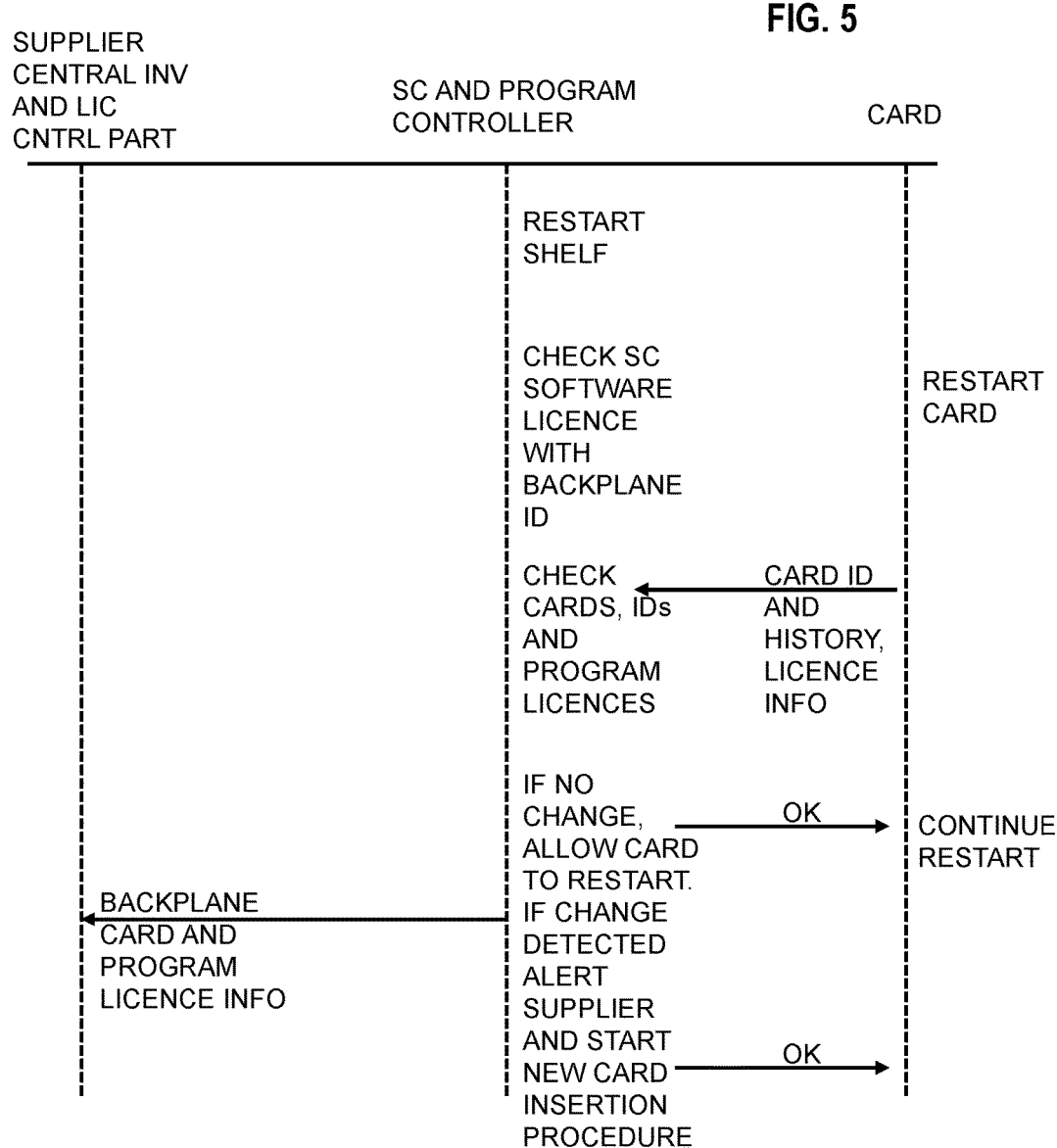
FIG. 5 shows another sequence chart according to an embodiment of the invention for the case of a shelf being restarted.

FIG. 5, Sequence Chart for Case of Shelf Restart

FIG. 3 shows some of the actions in the form of a sequence chart, for the same elements as shown in FIG. 4, but showing actions when the shelf controller is initialised, e.g. after a power down, or other reset, or when the shelf controller is first inserted in the backplane for example. In this case, the sequence begins with the shelf controller restarting itself. The shelf controller checks the licence information of the software it has, with the ID of its own backplane, to ensure consistency. Assuming that check is passed, the program controller then receives information from the cards which have also restarted. Such information can include card identifiers, and program licence information. The program controller checks the information matches its own stored information, stored before the shutdown. If there has been no change, the program controller allows the card to continue the restart. If a change has been detected, the program controller will alert the supplier control element, and will start the new card insertion procedure. The program controller will send information such as the backplane, card, and software licence information to the supplier control element. The supplier control element can take appropriate enforcement action to stop further use, or to obtain further higher level authorisation if appropriate.

Figure 6:
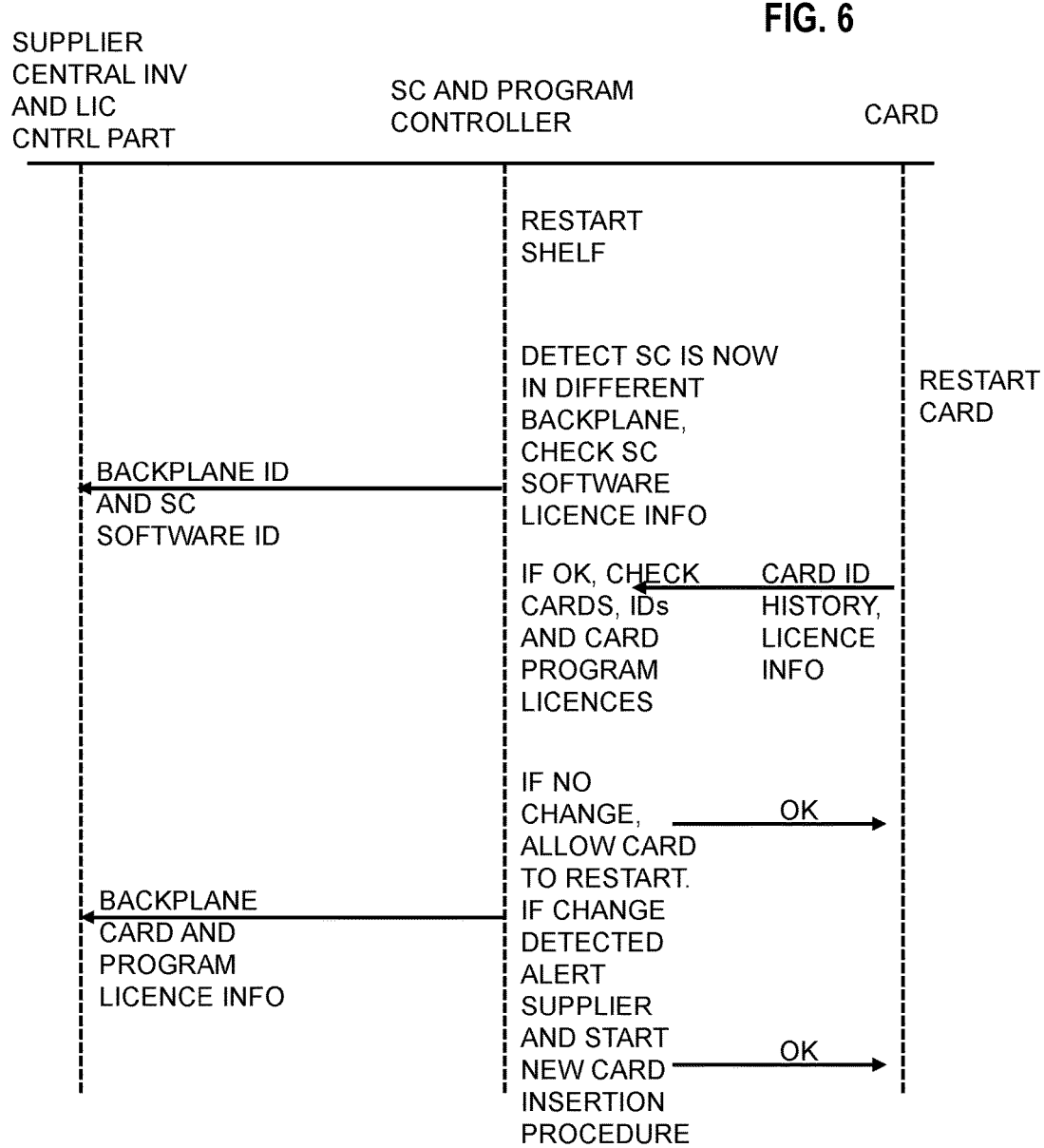
FIG. 6 shows another sequence chart according to an embodiment of the invention for the case of a shelf controller being inserted in a different backplane

FIG. 6 Sequence Chart for Case of Shelf Controller Detecting a Different Backplane FIG. 6 shows a sequence chart similar to that of FIG. 5, but shows actions when the shelf controller detects it is coupled to a different backplane. The shelf controller alerts the suppliers central control part either immediately, or stores the information for a later inventory gathering time. In the meantime, the shelf controller checks its own software licence to see if the new backplane ID is on its list of authorized backplanes. If there is a match, the shelf controller and the program controller continue as before, starting by checking to see if there has been any change in the cards or their program licence information.

FIG. 7

Figure 7:
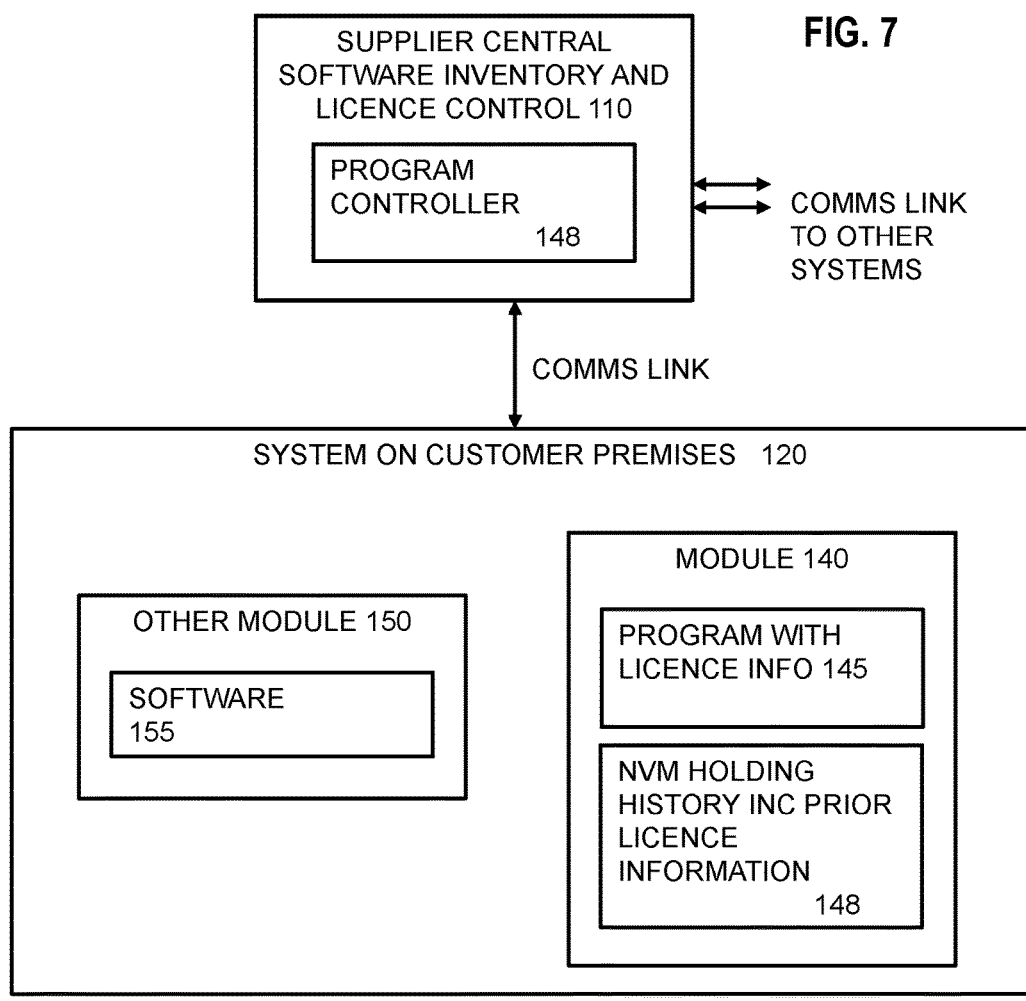
FIG. 7 shows an arrangement of elements according to an embodiment for a case of a remote located program controller and FIG. 8 shows an entity relationship chart for embodiments.

FIG. 7 shows in schematic form some of the principal elements of another example of an implementation. Many other examples can be envisaged. In this case the supplier's central software repository inventory and licence control part 110 also has the program controller 148. Being in a central location, this can conveniently serve many systems, coupled by comms links as before. One such system 120 on customer premises is shown. It includes a customer replaceable module 140, and another module 150 having its own software 155. Of course there can be many modules. The first module has a program 145 with associated licence information. It also has a non volatile memory 148 for holding history of use including licence information.

OTHER EXAMPLES

Figure 8:
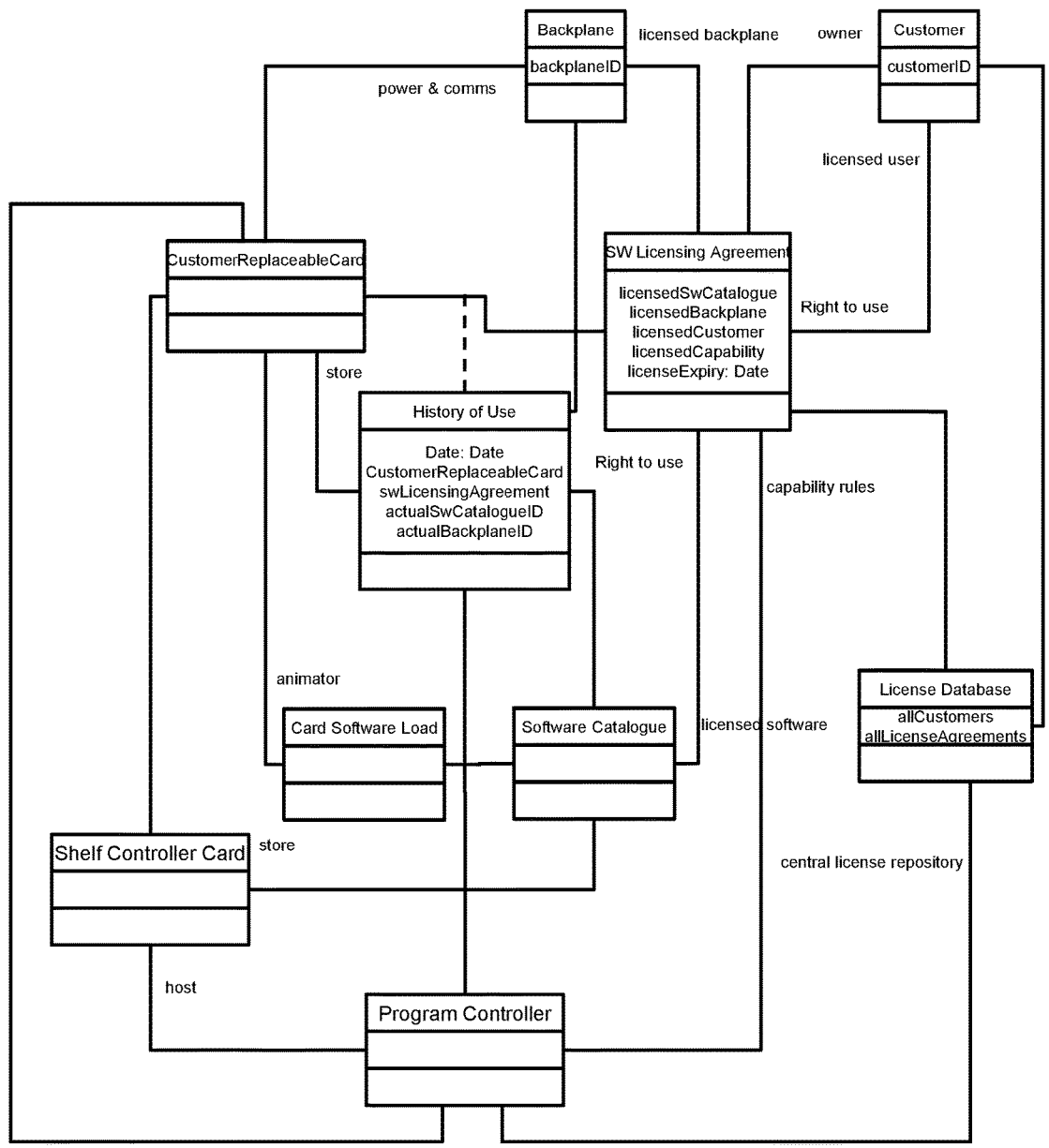

Another implementation could have the following software licence arrangements:
Distribute licences with all NE software
Tie licences to a particular customer
Tie licences to a particular backplane (where backplane has no sw duplication capability and is uniquely identified using a backplane identifier)
For each customer there is a list of valid backplanes—maintained by supplier customer support, assisted by the inventory collection at licence renewal time
For each customer there is one licence that is renewable periodically
Licences expire at a pre-determined date (or never)
Licences define software download and restart capabilities as follows (each discussed in more detail below):
Download to previously unknown shelf?
Upgrade customer's card?
Upgrade non-customer's card (card not originally sold to this customer) having non licenced program?
Upgrade card with no licence information?
Policy on licence expiry could specify the following
Disabling of capability defined by licence?
Alarm to supplier now or later?
Inventory tracking at the time of licence renewal?
Licence and inventory information encrypted using private key encryption.
Another possible feature is
History of each backplane/licence combination the card encounters maintained on each card in non-volatile memory FIG. 8. Entity Relationship Chart FIG. 8 shows an entity relationship chart showing some of the relationships of some of the entities described in this document, using the usual conventions for such charts. In this example the program controller is hosted by a shelf controller. The shelf controller is an instance of a customer replaceable card. The program controller manages software for customer replaceable cards. It does this by using the history of use of those cards which in this example is stored on the customer replaceable card. The history of use contains a chronological record of licensing agreements encountered by customer replaceable cards as identified buy a cardID, along with the actual backplane and software catalogue used at the time. The backplane provides power and communications for the customer replaceable card in this example of a modular system. The software catalogue which is stored on the shelf controller is composed of a number of card software loads which animate one or more customer replaceable cards. The software licensing agreement describes the pertinent information about the license. This includes the software catalogue for which the license grants a right to use, the backplane which it is licensed to run on, and the customer who is the owner and licensed user of the agreement. A date is stored for when the licence expires and the license agreement also defines capability rules that are used by the program controller in managing the software. The software licensing agreements are stored in a license database which acts as a central repository for all licensed agreements for all customers. Appropriate licenses are given to the program controller for it to use.

Licence Information Capability Field—Download to Unknown Shelf

This indicates the ability of a software catalogue to be downloaded to a shelf for further distribution to the cards on an NE. This can be checked on the NE (i.e. does its licence allow it to accept a new catalogue or not). Optional licence information could be held and checked on a management platform used for software distribution.

Licence Information Capability Field—Upgrade Customer's Card

This indicates the ability of a software load to be distributed from the NE load store to the other cards in the NE. When a load is distributed, the licence information distributed depends on where the card came from. If the card is already licensed to that customer, the licence information is copied to the card, otherwise it isn't copied—some other policy applies.

Licence Information Capability Field—Upgrade Non-Customer's Card

This indicates the ability of a software load to be upgraded on a card placed in the system that has a different customer's licence information. The card licence information is updated. The old card license/backplane information is logged in non-volatile memory with the fact it has been upgraded. An alternative option is to prevent upgrade and request customer to call supplier support—appropriate policy can then be applied. This may not be appropriate for high priority high availability systems. Inventory retrieval will identify this situation at license renewal time, to enable appropriate billing.

Licence Information Capability Field—Upgrade Non-Licensed Card

This indicates the ability of a software load to be upgraded on a card placed in the system that has no customer's licence information (e.g. card obtained from spares which has vintage prior to licence enforcement being put in place). The old card license (i.e. none)/backplane information is added to the history in non-volatile memory with the fact it has been upgraded. As before, an alternative option is to prevent upgrade and request customer to call supplier support—appropriate policy can then be applied. This may not be appropriate for high priority high availability systems. Inventory retrieval will identify this situation at license renewal time, to enable appropriate billing.

Operational Aspects

A customer would pay more for wider license capabilities e.g. freedom to upgrade a different-customer's card. When the licenses are to be renewed, inventory information is retrieved from the NE. As well as Card identifiers, card's licence information and history should also be retrieved to see where the cards came from. License renewal resets the expiry dates of the licenses on all cards. To reduce the complexity of distribution and to help the movement of shelf controllers between backplanes, each NE is sent the complete list of valid backplanes for that licence. A special command (secure) can allow license miss-matches to be cleared by sending the current license info down to the errant card (e.g. card from another customer). This is for use by supplier support, not the customer.

List of Scenarios
  License distribution
  License expiry
  Customer restarting system
  Customer recomissioning existing system
    Owned by customer
    Obtained from another customer or from grey market
  Customer commissioning new system
    Customer has bought new system from Nortel (with licences)
    Customer has taken over network previously owned by another customer
  Customer upgrading system
  Customer inserting new customer card into system
  Customer inserting new non-customer car into system
  Customer inserting non-licensed card into system
  Customer installing a new bay
Licence Information Distribution
  Current licence information can be distributed from the distribution agent (e.g. central management system). The capability bit will determine whether licenses can be distributed to new bays or whether supplier authorisation will be required. The distribution agent will contain a list of valid backplanes as part of the overall licence agreed. The supplier will retain a list of valid backplanes for that customer as part of the overall licence.
Licence Expiry
  When the licence expires, predetermined policy shall be applied. The licence information is renewed via secure exchange. Inventory information from that system is sent back, including licence information and history. All cards in the NE have their licence information updated—unless prohibited by the capability of the new licence information. At licence expiry time, a customer may be asked to purchase a licence (e.g. if the system was not originally purchased by the customer) or the supplier may waive this.
Customer Restarting System
  When the SC is restarted, it's license is checked against the backplane identifier. If the license does not match, expired license policy is applied. When customer replaceable card is restarted, it's licence information is checked. If the card has an identical license to that of the SC, the card restarts per normal. If the card has a different or missing license other policies are applied e.g. as for new card being inserted into bay.
Customer Recomissioning Existing System Owned by Customer
  The licence information is not reset on any card when the system is decommissioned. Afterwards the system follows the scenario as if it were restarting
Customer Recomissioning Existing System Previously Owned by Another Customer
  The licence information is not reset on any card when the system is decommissioned. Afterwards the system follows the scenario as if it were restarting. At licence expiry time, this bay will be identified as not previously belonging to the existing customer—and further action taken.
Customer Commissioning New System
  Scenario 1: Customer has bought new system with licences: The licence information in this case would follow the Licence Distribution scenario. Afterwards the system follows the scenario as if it were restarting.
  Scenario 2: Customer has taken over existing network previously owned by another customer: If the NE's in the network already have licence information on the cards, they would be able to restart (if needed) and the system follows the scenario as if it were restarting. If it is not feasible to enforce a new licence for a new customer who has taken over a network, the system would start up assuming the owner was the previous customer. In this case, when licence expiry is reached, renewal will require a new customer key to be used (but this will have to be enforced by the supplier). The policy will depend on the agreement between supplier and the new customer (i.e. whether a new licence has to be purchased or the old one is transferred).
Customer Upgrading System
  The new software will only be distributed if the upgrade capability is set on the existing license. If this capability is not set, the customer will have to call the supplier to upgrade their licence to enable this capability. An alternative policy is to add the upgrade to the history, and use the history at licence renewal time to negotiate with customer. This is checked on both the distribution (e.g. element manager) and the SC. After the new software is distributed, the system follows the behaviour as if the system was restarted. Licence information is not changed on any card.
Customer Inserting New Customer Card into System
  Following a card restart (e.g. power cycle, card restart) the licence information is compared with that held on the SC. If the licence information customer ids match the system behaves as if the card has been restarted. If not other scenarios apply e.g. Card with no licence info as discussed above, or Card inserted into a system not originally owned by customer.
Customer Inserting New Non-Customer Card into System
  Following a card restart (e.g. power cycle, card restart) the licence information is compared with that held on the SC. If the licence information customer ID does not match the system checks the capability bit. If the capability bit is set the card is upgraded. The licence information is updated on the card, the old licence/backplane IDs are added to the history in non-volatile memory on the card.
Customer Inserting Non-Licensed Card into System
  Following a card restart (e.g. power cycle, card restart) the licence information is compared with that held on the SC. If there is no licence information the capability bit is checked. If the capability bit is set the card is upgraded. The licence information is updated on the card, the old license (i.e. none)/backplane logged in non-volatile memory on the card
Customer Installing a New Bay
  A license will have to be issued for that bay by calling the supplier to add that backplane to the licence. An alternative strategy is to allow bay to use existing licence, log the fact in the history in non-volatile memory on all the cards, and then negotiate with the customer at licence renewal time.
SC Moving to Another Bay
  If a SC is moved to another bay, it will look up in its licence information whether that backplane is supported by that licence. If not, other scenarios apply (e.g. new bay)
Typical Customer Licence Information Capability Settings
  Download to unknown shelf—No
  Download to card—Yes
  Upgrade customer's card—Yes
  Upgrade non-customer's card—No
  Upgrade non-licensed card—No
  With these settings the customer would only be able to download software to shelves and cards that were owned by the customer. If they tried to download software to a card that was previously owned by another customer, the would have to contact the supplier to get the licence upgraded.
Concluding Remarks
  As has been described above, a program controller is arranged to automatically authorize or configure or upgrade a program for a customer replaceable card of a system, the controller being arranged to manage the program automatically, according to a licence agreement, and according to a stored history of use of the hardware module. A supplier can track customer changes and enforce more easily different conditions for authorising the program on, different modules from different sources, having different levels of capability. There can be less interaction with the supplier to get specific authorizations. The history can be stored on the module. It can be used to ease inventory tracking and generating billing information.

This has a number of advantages, particularly for any multi-processor system which relies on automatic distribution of software to cards which can be field replaced by the customer. For example where a supplier wishes to offer different levels of software versions to different systems of the same customer, it can enable the supplier to enforce different payments even if the customer swaps modules from higher versioned systems to cheaper systems. Furthermore, the program controller can use the history for other purposes such as automatically maintaining an inventory of the modules and the software held by each customer. It is often impractical to keep such an inventory up to date otherwise, if customers are free to swap modules. Such an inventory can enable the supplier to offer different levels of hardware servicing to different customers or to different systems of each customer. Another advantage is that the controller can use the history to enforce consistency between program version and module type or version.

This history can help enable the controller to ensure that different levels of service and different versions of software can be applied correctly depending on the history. This can help ensure consistency between module and software versions, and can help enable a supplier to enforce different levels of licence while allowing a customer to change modules with a minimum of intervention from the supplier the history can include details of software loaded most recently, or can include details of several or all prior loadings. The details can include the customer ID, the software version, the backplane ID, or other details, to enable enforcement of licensing terms which are specific to each customer, to different backplanes, or to different versions of the software, respectively. Optionally the history could simply comprise a logical flag to indicate that the module has been loaded at some time.

The controller can be arranged to prevent use of part or all of the program. The preventing use can encompass preventing execution, or preventing distribution or copying of any kind. Optionally the controller can trigger an alert to a customer or a supplier as well as or instead of preventing use. The history can have an indication of an identity of systems the module has been previously coupled to. This helps avoid the problem of an older module being taken from another system and having a new program installed without permission. The program can have licence information indicating which systems the program is authorized to be used with. The licence information can indicate if the program can be downloaded to a shelf for automatic distribution to modules. The licence information can indicate if the program can be distributed to the module. The license mechanism can be arranged to update the log with an indication of the program and the licence.

It can address the problem of software distribution by the NE e.g. software being downloaded to a card once plugged into the bay. A card taken from another customer's network could be plugged into a valid, licensed bay which then would be upgraded by the shelf without a valid agreement to do so between supplier and the customer. It can restrict functionality to software upgrade only. It can associate the RTUs with backplanes owned by customers rather than an RTU for a given system or type of NE.

It differs from standard licensing in that it licenses the card, software and backplane not just the software alone, and it can determines the validity based on the combination of the licence and card's history (which backplanes it has been inserted into). Notable features include:

1) It can check and report violations of the right to use RTU, by distributing the program only under certain circumstances to new cards.

2) It can introduce a tracking mechanism to monitor a cards history of which backplanes it has encountered. This is useful when a licence agreement is renewed, and billing or negotiation can depend on such information.

3) It can use a card's history to determine whether the licensed software can be used on the card.

4) It configures the functionality that is restricted by the licence which can be done on a per licence basis. One example is to allow all functionality but use the mechanism to track violations at licence renewal time when inventory information (and licence payments) is retrieved in exchange for a licence key.

It can expand the possibilities of higher revenues by preventing use of software/hardware outside the Right To Use (RTU) agreement. It can also open up the possibility of enforcing more regular charging of software use e.g. annual maintenance/software licence contracts. It can also help identify and prevent support for hardware sent back to the supplier for repair which isn't covered by a current maintenance agreement. It can help detect and prevent hardware use within a customer's network that is not covered by a Right To Use (RTU) agreement. Enforcement of software licence agreements and detection and prevention of software use within the network at the moment that is not cover by a RTU agreement is also facilitated.

Other variations will be apparent to those skilled in the art, having corresponding advantages to those set out above, within the scope of the claims.

The invention claimed is:

1. A modular system forming a network element in a telecommunications system, the modular system comprising:
   one or more hardware modules which are customer replaceable each comprising a processor and associated memory for running software, each of the one or more hardware modules carry out functions for a telecommunications network;
   a backplane, wherein the one or more hardware modules are configured to plug into the backplane; and
   a processor running a program controller for the modular system;
   wherein the processor in the one or more hardware modules is configured to execute a program when each is plugged into the backplane and the program is separately executed from the program controller, and wherein the associated memory in the one or more hardware modules contains a history of use of the associated hardware module including a list of backplanes that have used the associated hardware module and license information indicative of authorization to use the associated hardware module; and
   wherein the program controller is configured to automatically manage each of the associated hardware modules in conjunction with the program executed on the processor and the associated memory in the associated hardware modules to determine whether the license information indicates authorization for the associated hardware module to be used with a particular backplane and control use of the software associated with the associated hardware module and use of the associated hardware module with the modular system, according to the license information.

2. The modular system of claim 1, wherein at least part of the history of use is obtained from the associated hardware module.

3. The modular system of claim 1, wherein the program controller is part of a shelf controller for managing modules in the form of cards for carrying out functions of the network element for the telecommunications network, wherein the shelf controller is configured to control and monitor traffic between the plurality of hardware modules plugged into the backplane.

4. The modular system of claim 1, wherein the program controller is configured to determine an identity of the modular system and determine whether the program is authorized for use with that modular system.

5. The modular system of claim 1, wherein the history of use comprises a program identifier of a program previously loaded on the associated hardware module.

6. The modular system of claim 1, wherein the history of use comprises a license identifier of a program previously loaded on the associated hardware module.

7. The modular system of claim 1, wherein the program controller is located remoted from the backplane and is coupled to the backplane by a communications link.

8. The modular system of claim 1, wherein the program controller maintains an inventory record of identities and relationships of modules, programs, and license information for a given customer.

9. The modular system of claim 1, wherein the program controller copies at least a part of the program to the hardware module at initialization.

10. The modular system of claim 1, wherein the program controller authorizes at least a part of the program for the hardware module at initialization.

11. The modular system of claim 1, wherein the program has license information indicating a capability licensed, and wherein the program controller configures the program according to the capability licensed.

12. The modular system of claim 1, wherein the program has license information indicating license expiry information.

13. The modular system of claim 1, wherein the program controller is executed on a shelf controller of the modular system, the shelf controller stores or generates a copy of the program for downloading to the associated hardware module when plugged into the backplane.

14. The modular system of claim 1, wherein the license information indicates licenses for the associated hardware module, software in the modular system, and the backplane, and performs configuration based on a combination of the licenses.

15. The modular system of claim 1, wherein the software is distributed from an element management system to the program controller to the hardware module, based on the license information.

16. The modular system of claim 1, wherein the program controller is configured to checking a configuration of the associated hardware module when it is plugged into the backplane.

17. The modular system of claim 1, wherein the history of use of the associated hardware module is only stored on the associated hardware module, and accessed by the program controller whenever the associated hardware module is plugged into the backplane or any other backplane.

18. The modular system of claim 1, wherein the program controller is configured to maintain a history of all of the plurality of hardware modules that have plugged into the backplane.

19. The modular system of claim 1, wherein the program controller is configured to use the history of use to enforce consistency between a version of the program and a module type or version of the associated hardware module.

20. A modular network element system in a telecommunications system, comprising:
one or more hardware modules;
a backplane wherein the one or more hardware modules are configured to plug into a backplane of the modular network element system, each of the one or more hardware modules carry out functions for a telecommunications network, each hardware module having a processor and memory storing
a history of use of the hardware module, the stored history including a list of backplanes that have used the hardware module; and
license information indicative of authorization to use the hardware modules; and
a processor running a program controller for the network element system, wherein the program controller is either part of the modular network element system or in communication therewith, wherein the program controller is configured to
manage a program stored on and executed on the processor of at least one of the one or more hardware modules of the modular network element system automatically when plugged into the backplane and the program is executed separately from the program controller, the hardware module being a customer-replaceable part, the program controller being arranged to manage the hardware module in conjunction with the program to automatically determine whether the license information indicates authorization for the hardware module to be used with a particular backplane and to control use of software associated with the hardware module and use of the hardware module with the modular network element system according to the license information.

21. The modular network element system of claim 20, further comprising:
an interface for coupling the modular network element system to a remote server to pass information for a supplier to maintain an inventory of programs and modules associated with the modular network element system.

22. A method implemented in a modular system comprising one or more hardware modules which are customer replaceable each comprising a processor and associated memory for running software; a backplane, wherein the one or more hardware modules are configured to plug into the backplane; and a processor running a program controller for the modular system, each of the one or more hardware modules carry out functions for a telecommunications network, the method comprising:
executing a program by the processor in the one or more hardware modules when each is plugged into the backplane and the program is separately executed from the program controller, wherein the associated memory in the one or more hardware modules contains a history of use of the associated hardware module including a list of backplanes that have used the associated hardware module and license information indicative of authorization to use the associated hardware module; and automatically managing, by the program controller, each of the associated hardware modules in conjunction with the program executed on the processor and the associated memory in the associated hardware modules to determine whether the license information indicates authorization for the associated hardware module to be used with a particular backplane and controlling use of the software associated with the associated hardware module and use of the associated hardware module with the modular system, according to the license information.

23. A method for a modular system forming a network element in a telecommunications system, the method comprising:

providing one or more hardware modules which are customer replaceable each comprising a processor and associated memory for running software, each of the one or more hardware modules carry out functions for a telecommunications network;

providing a backplane, wherein the one or more hardware modules are configured to plug into the backplane; and providing a processor running a program controller for the modular system;

wherein the processor in the one or more hardware modules is configured to execute a program when each is plugged into the backplane and the program is separately executed from the program controller, and wherein the associated memory in the one or more hardware modules contains a history of use of the associated hardware module including a list of backplanes that have used the associated hardware module and license information indicative of authorization to use the associated hardware module; and wherein the program controller is configured to automatically manage each of the associated hardware modules in conjunction with the program executed on the processor and the associated memory in the associated hardware modules to determine whether the license information indicates authorization for the associated hardware module to be used with a particular backplane and control use of the software associated with the associated hardware module and use of the associated hardware module with the modular system, according to the license information.

24. A system, comprising:

a plurality of network elements each comprising:

one or more hardware modules which are customer replaceable each comprising a processor and associated memory for running software, each of the one or more hardware modules carry out functions for a telecommunications network;

a backplane, wherein the one or more hardware modules are configured to plug into the backplane; and a processor running a program controller for the associated network element;

wherein the processor in the one or more hardware modules is configured to execute a program when each is plugged into the backplane and the program is separately executed from the program controller, and wherein the associated memory in the one or more hardware modules contains a history of use of the associated hardware module including a list of backplanes that have used the associated hardware module and license information indicative of authorization to use the associated hardware module; and wherein the program controller is configured to automatically manage each of the associated hardware modules in conjunction with the program executed on the processor and the associated memory in the associated hardware modules to determine whether the license information indicates authorization for the associated hardware module to be used with a particular backplane and control use of the software associated with the associated hardware module and use of the associated hardware module with the associated network element, according to the license information; and a central system communicatively coupled to the plurality of network elements for a supplier to maintain an inventory of programs and modules associated with each of the plurality of network elements.

* * * * *